US012231736B2

(12) United States Patent
Liu et al.

(10) Patent No.: US 12,231,736 B2
(45) Date of Patent: Feb. 18, 2025

(54) BULLET-SCREEN COMMENT DISPLAY

(71) Applicant: SHANGHAI BILIBILI TECHNOLOGY CO., LTD., Shanghai (CN)

(72) Inventors: Jun Liu, Shanghai (CN); Yicheng Zhu, Shanghai (CN); Jingping Zhao, Shanghai (CN); Yu Zhou, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 24 days.

(21) Appl. No.: 18/483,482

(22) Filed: Oct. 9, 2023

(65) Prior Publication Data

US 2024/0137619 A1 Apr. 25, 2024
US 2024/0236436 A9 Jul. 11, 2024

(30) Foreign Application Priority Data

Oct. 25, 2022 (CN) .......................... 202211313615.0

(51) Int. Cl.
*H04N 21/4788* (2011.01)
*G06V 10/25* (2022.01)
(Continued)

(52) U.S. Cl.
CPC ......... *H04N 21/4788* (2013.01); *G06V 10/25* (2022.01); *H04N 21/2187* (2013.01);
(Continued)

(58) Field of Classification Search
CPC ........... H04N 21/4788; H04N 21/2187; H04N 21/234363; H04N 21/2743;
(Continued)

(56) References Cited

U.S. PATENT DOCUMENTS

2017/0180589 A1 6/2017 Guo et al.
2020/0029119 A1* 1/2020 Wang ................. H04N 21/4318
(Continued)

FOREIGN PATENT DOCUMENTS

CN 108124185 A 6/2018
CN 111935508 A 11/2020
(Continued)

OTHER PUBLICATIONS

First Office Action of the counterpart CN application No. 202211313615.0, official mailing date: Aug. 16, 2024, 9 pages.

*Primary Examiner* — Alazar Tilahun
(74) *Attorney, Agent, or Firm* — FisherBroyles, LLP

(57) ABSTRACT

A bullet-screen comment display method is provided. The method includes: detecting a target object in an original frame image of a video at a first preset frequency in a process of playing the video, and when the target object is detected, outputting a display area of the target object in the original frame image; generating a mask image corresponding to the original frame image based on the display area, obtaining a bullet-screen comment display area corresponding to the original frame image; and if there is an overlapping area between the bullet-screen comment display area and the display area of the target object in the original frame image, combining the mask image and a bullet-screen comment displayed in the bullet-screen comment display area into a video picture with a non-obstructive bullet-screen comment, and displaying the video picture with a non-obstructive bullet-screen comment at a bullet-screen comment layer, where a bullet-screen comment included in the video picture with a non-obstructive bullet-screen comment does not block the target object.

20 Claims, 5 Drawing Sheets

(51) Int. Cl.
*H04N 21/2187* (2011.01)
*H04N 21/2343* (2011.01)
*H04N 21/2743* (2011.01)

(52) U.S. Cl.
CPC . *H04N 21/234363* (2013.01); *H04N 21/2743* (2013.01); *G06V 2201/07* (2022.01)

(58) Field of Classification Search
CPC ......... H04N 21/23418; H04N 21/4316; H04N 21/4318; H04N 21/4884; H04N 21/4312; H04N 21/44; H04N 21/47217; H04N 21/845; H04N 21/235; H04N 21/435; H04N 21/45455; H04N 21/4882; H04N 21/8547; H04N 21/44008; G06V 10/25; G06V 2201/07; G06V 20/41; G06V 20/46; G06V 40/10
See application file for complete search history.

(56) References Cited

U.S. PATENT DOCUMENTS

2020/0364461 A1* 11/2020 Shi ................. G06V 10/806
2021/0120305 A1* 4/2021 Duan ................. H04N 21/235

FOREIGN PATENT DOCUMENTS

| CN | 112752110 A | 5/2021 |
| CN | 109862414 B | 10/2021 |

* cited by examiner

BULLET-SCREEN COMMENT DISPLAY

CROSS-REFERENCE TO RELATED APPLICATIONS

This application claims priority to Chinese Patent Application No. 202211313615.0, filed on Oct. 25, 2022, the entire content of which is hereby incorporated by reference in its entirety for all purposes.

TECHNICAL FIELD

This application relates to video technologies, and in particular, to bullet-screen comment display.

BACKGROUND

When a video is played by using a client or a website, if a bullet-screen comment function is enabled, bullet-screen comment content is played while a video picture is played. However, in a bullet-screen comment display process, the bullet-screen comment content on a screen often blocks key content (for example, an image of a person) in the video picture, resulting in relatively poor user experience.

SUMMARY

In view of this, a bullet-screen comment display method and apparatus, a computer device, and a computer-readable storage medium are provided.

This application provides a bullet-screen comment display method, including:
  detecting a target object in an original frame image of a video at a first preset frequency in a process of playing the video, and when the target object is detected, outputting a display area of the target object in the original frame image;
  generating a mask image corresponding to the original frame image based on the display area;
  obtaining a bullet-screen comment display area corresponding to the original frame image; and
  if there is an overlapping area between the bullet-screen comment display area and the display area of the target object in the original frame image, combining the mask image and a bullet-screen comment displayed in the bullet-screen comment display area into a video picture with a non-obstructive bullet-screen comment, and displaying the video picture with a non-obstructive bullet-screen comment at a bullet-screen comment layer, where a bullet-screen comment included in the video picture with a non-obstructive bullet-screen comment does not block the target object.

Optionally, the detecting a target object in an original frame image of a video at a first preset frequency in a process of playing the video, and when the target object is detected, outputting a display area of the target object in the original frame image includes:
  detecting, in real time in the process of playing the video, whether a quantity of bullet-screen comments displayed on a current screen exceeds a preset quantity; and
  if the quantity of bullet-screen comments displayed on the current screen exceeds the preset quantity, detecting the target object in the original frame image of the video at the first preset frequency, and when the target object is detected, outputting the display area of the target object in the original frame image.

Optionally, the detecting a target object in an original frame image of a video at a first preset frequency, and when the target object is detected, outputting a display area of the target object in the original frame image includes:
  obtaining the original frame image of the video at the first preset frequency;
  performing resolution sampling processing on the obtained original frame image to obtain a frame image with target resolution; and
  detecting the target object in the frame image with the target resolution, and when the target object is detected, outputting the display area of the target object in the original frame image.

Optionally, the detecting a target object in an original frame image of a video at a first preset frequency in a process of playing the video, and when the target object is detected, outputting a display area of the target object in the original frame image includes;
  detecting the target object in the original frame image of the video at a second preset frequency in the process of playing the video; and
  after it is detected that the original frame image includes the target object, detecting the target object in the original frame image of the video at the first preset frequency, and when the target object is detected, outputting the display area of the target object in the original frame image.

Optionally, the method further includes:
  providing a frequency setting interface, so that a user sets the first preset frequency based on the frequency setting interface.

Optionally, the detecting a target object in an original frame image of a video at a first preset frequency in a process of playing the video, and when the target object is detected, outputting a display area of the target object in the original frame image includes:
  detecting the target object in the original frame image of the video at the first preset frequency by using a first thread in the process of playing the video, and when the target object is detected, outputting the display area of the target object in the original frame image; and
  the generating a mask image corresponding to the original frame image based on the display area includes:
  generating the mask image corresponding to the original frame image based on the display area by using a second thread.

Optionally, the detecting a target object in an original frame image of a video, and when the target object is detected, outputting a display area of the target object in the original frame image includes:
  detecting the target object in the original frame image of the video by using a target object detection model obtained based on a machine learning algorithm, and when the target object is detected, outputting the display area of the target object in the original frame image.

Optionally, the detecting a target object in an original frame image of a video at a first preset frequency in a process of playing the video, and when the target object is detected, outputting a display area of the target object in the original frame image includes:
  sampling the original frame image of the video at the first preset frequency in the process of playing the video, and uploading the original frame image obtained through sampling to a server, so that the server detects the target object in the original frame image obtained through sampling, and when the target object is detected, the server outputs the display area of the target object in the original frame image; and receiving the display area that is of the target object in the original frame image and that is output by the server.

This application further provides a bullet-screen comment display apparatus, including:

an output means, configured to: detect a target object in an original frame image of a video at a first preset frequency in a process of playing the video, and when the target object is detected, output a display area of the target object in the original frame image;

a generation means, configured to generate a mask image corresponding to the original frame image based on the display area;

an obtaining means, configured to obtain a bullet-screen comment display area corresponding to the original frame image; and a display means, configured to: if there is an overlapping area between the bullet-screen comment display area and the display area of the target object in the original frame image, combine the mask image and a bullet-screen comment displayed in the bullet-screen comment display area into a video picture with a non-obstructive bullet-screen comment, and display the video picture with a non-obstructive bullet-screen comment at a bullet-screen comment layer, where a bullet-screen comment included in the video picture with a non-obstructive bullet-screen comment does not block the target object.

This application further provides a bullet-screen comment display system. The bullet-screen comment display system includes an online streamer terminal, a plurality of clients installed on an audience terminal, a video server, and a bullet-screen comment server. The audience terminal is a terminal device of an audience user who views, in a live room of an online streamer, live streaming performed by the online streamer by using the online streamer terminal.

The online streamer terminal is configured to upload a live video of the online streamer to the video server.

The video server is configured to forward the live video to the audience terminal of the audience user who views the live video in the live room of the online streamer.

The bullet-screen comment server is configured to: store a bullet-screen comment sent by the audience user, and forward the stored bullet-screen comment to each client for display by each client.

Each client is configured to: detect a target object in an original frame image of the live video at a first preset frequency in a process of playing the live video, and when the target object is detected, output a display area of the target object in the original frame image; generate a mask image corresponding to the original frame image based on the display area; obtain a bullet-screen comment display area corresponding to the original frame image; and if there is an overlapping area between the bullet-screen comment display area and the display area of the target object in the original frame image, combine the mask image and a bullet-screen comment displayed in the bullet-screen comment display area into a video picture with a non-obstructive bullet-screen comment, and display the video picture with a non-obstructive bullet-screen comment at a bullet-screen comment layer, where a bullet-screen comment included in the video picture with a non-obstructive bullet-screen comment does not block the target object.

This application further provides a computer device. The computer device includes a memory, a processor, and a computer program stored in the memory and capable of running on the processor. The processor implements the steps of the foregoing method when executing the computer program.

This application further provides a computer-readable storage medium. The computer-readable storage medium stores a computer program. When the computer program is executed by a processor, the steps of the foregoing method are implemented.

DESCRIPTION OF EMBODIMENTS

The following further describes the advantages of this application with reference to the accompanying drawings and embodiments.

The example embodiments are described in detail herein and the examples are shown in the accompanying drawings. When the following descriptions relate to the accompanying drawings, unless otherwise specified, a same number in different accompanying drawings represents a same or similar element. The implementations described in the following example embodiments do not represent all implementations consistent with this disclosure. On the contrary, they are only examples of apparatuses and methods that are described in the appended claims in detail and that are consistent with some aspects of this disclosure.

The terms used in this disclosure are merely used to describe embodiments, and are not intended to limit this disclosure. The terms "a". "said", and "the" of singular forms used in this disclosure and the appended claims are also intended to include plural forms, unless otherwise specified in the context clearly. It should be further understood that the term "and/or" used in this specification indicates and includes any or all possible combinations of one or more associated listed items.

It should be understood that although terms "first", "second", "third", and the like may be used in this disclosure to describe various types of information, the information is not limited by these terms. These terms are only used to distinguish between information of the same type. For example, without departing from the scope of this disclosure, first information may also be referred to as second information. Similarly, the second information may also be referred to as the first information. Depending on the context, for example, the word "if" used herein can be interpreted as "while", "when", or "in response to determining".

In the descriptions of this application, it should be understood that numerical symbols before steps do not indicate a sequence of performing the steps, but are merely used to facilitate description of this application and differentiation of each step, and therefore cannot be construed as a limitation on this application.

Figure 1:
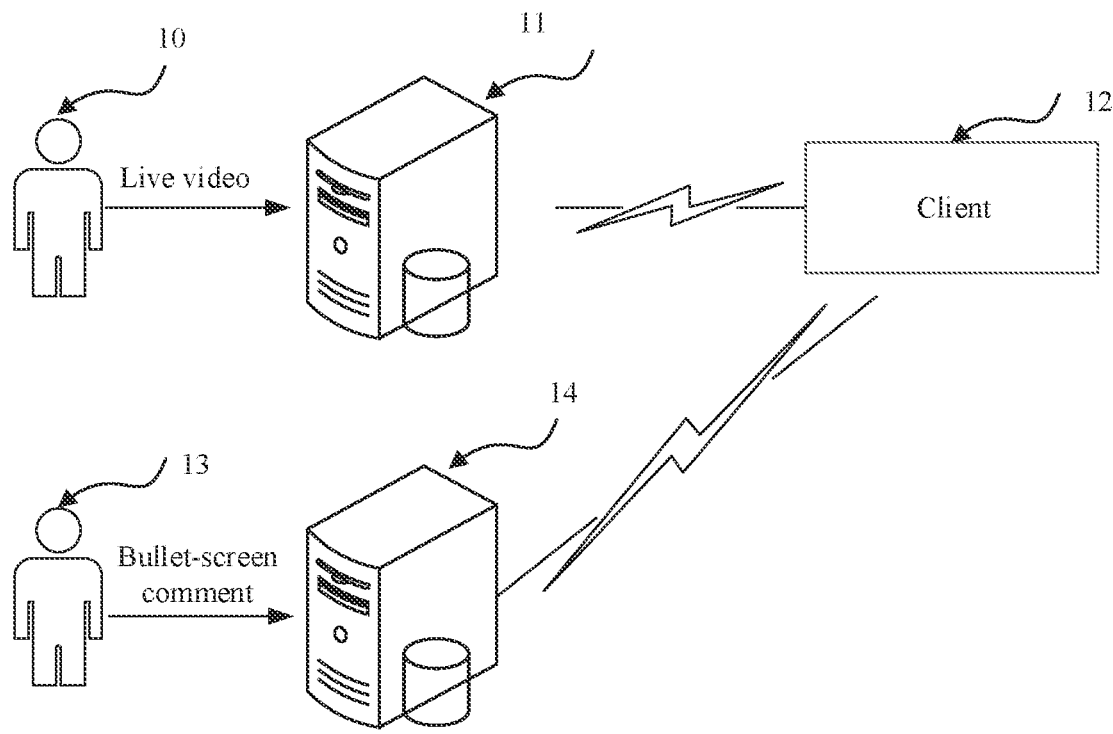
FIG. 1 is a schematic environment diagram of an embodiment of a bullet-screen comment display method according to an embodiment of this application.

FIG. 1 is a schematic diagram of a live streaming application scenario according to an embodiment of this application. The application scenario includes an online streamer 10, a live video server 11, a client 12, an audience 13, and a bullet-screen comment server 14. The live video server 11, the client 12, and the bullet-screen comment server 14 are located in a wireless network or a wired network, and the online streamer 10 sends a live video to the live video server 11 by using an online streamer terminal. The audience 13 sends a bullet-screen comment by using an audience terminal, and uploads the sent bullet-screen comment to the bullet-screen comment server. Another audience may obtain the live video from the live video server 11 and obtain the bullet-screen comment from the bullet-screen comment server 14 by using a client installed on an audience terminal of the another audience or a webpage end, to view the live video and display the bullet-screen comment.

In this embodiment of this application, each of the live video server 11 and the bullet-screen comment server 14 may be a separate server, a server cluster, a local server, or a cloud server. A type of the server may not be limited in this embodiment of this application. Each of the online streamer terminal and the audience terminal may be a mobile phone, a smartphone, a notebook computer, a desktop computer, a tablet computer, a personal digital assistant (PDA), a media player, a smart television, a wearable electronic device, or the like. A type of the terminal device may not be limited in this embodiment of this application.

The client 12 may be a computer application (APP) or a web client. The web client may be an application developed based on a web architecture.

Figure 2:
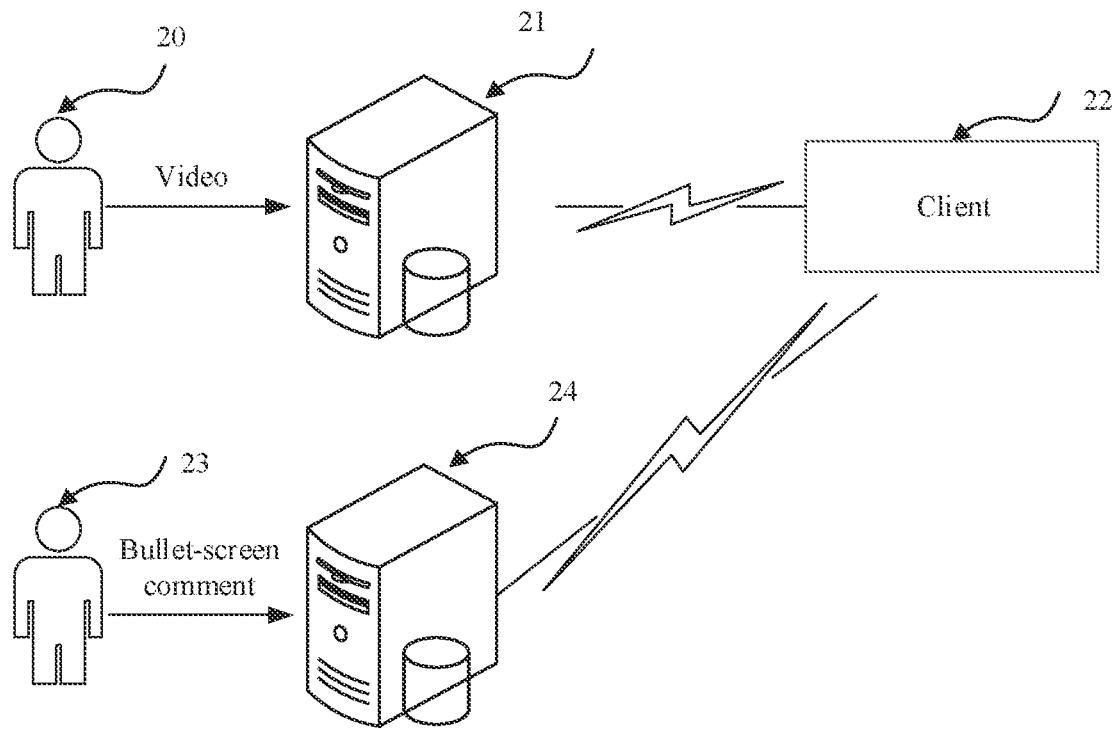
FIG. 2 is a schematic environment diagram of another embodiment of a bullet-screen comment display method according to an embodiment of this application.

FIG. 2 is a schematic diagram of an on-demand application scenario according to an embodiment of this application. The application scenario includes a creator 20, an on-demand video server 21, a client 22, an audience 23, and a bullet-screen comment server 24. The on-demand video server 21, the client 22, and the bullet-screen comment server 24 are located in a wireless network or a wired network, and the creator 20 uploads a created video to the on-demand video server 21 by using a terminal device. The audience 23 sends a bullet-screen comment by using an audience terminal, and uploads the sent bullet-screen comment to the bullet-screen comment server. Another audience may obtain the video from the on-demand video server 21 and obtain the bullet-screen comment from the bullet-screen comment server 24 by using a client installed on an audience terminal of the another audience or a webpage end, to view the video and display the bullet-screen comment.

In this embodiment of this application, the on-demand video server 21 and the bullet-screen comment server 24 may be a separate server, a server cluster, a local server, or a cloud server. A type of the server may not be limited in this embodiment of this application. Each of the online streamer terminal and the audience terminal may be a mobile phone, a smartphone, a notebook computer, a desktop computer, a tablet computer, a personal digital assistant (PDA), a media player, a smart television, a wearable electronic device, or the like. A type of the terminal device may not be limited in this embodiment of this application.

In this embodiment, the client 22 may be a computer application (APP) or a web client. The web client may be an application developed based on a web architecture.

To resolve a problem, in the conventional technology, that bullet-screen comment content on a screen often blocks key content in a video picture, a bullet-screen comment display method is provided.

Figure 3:
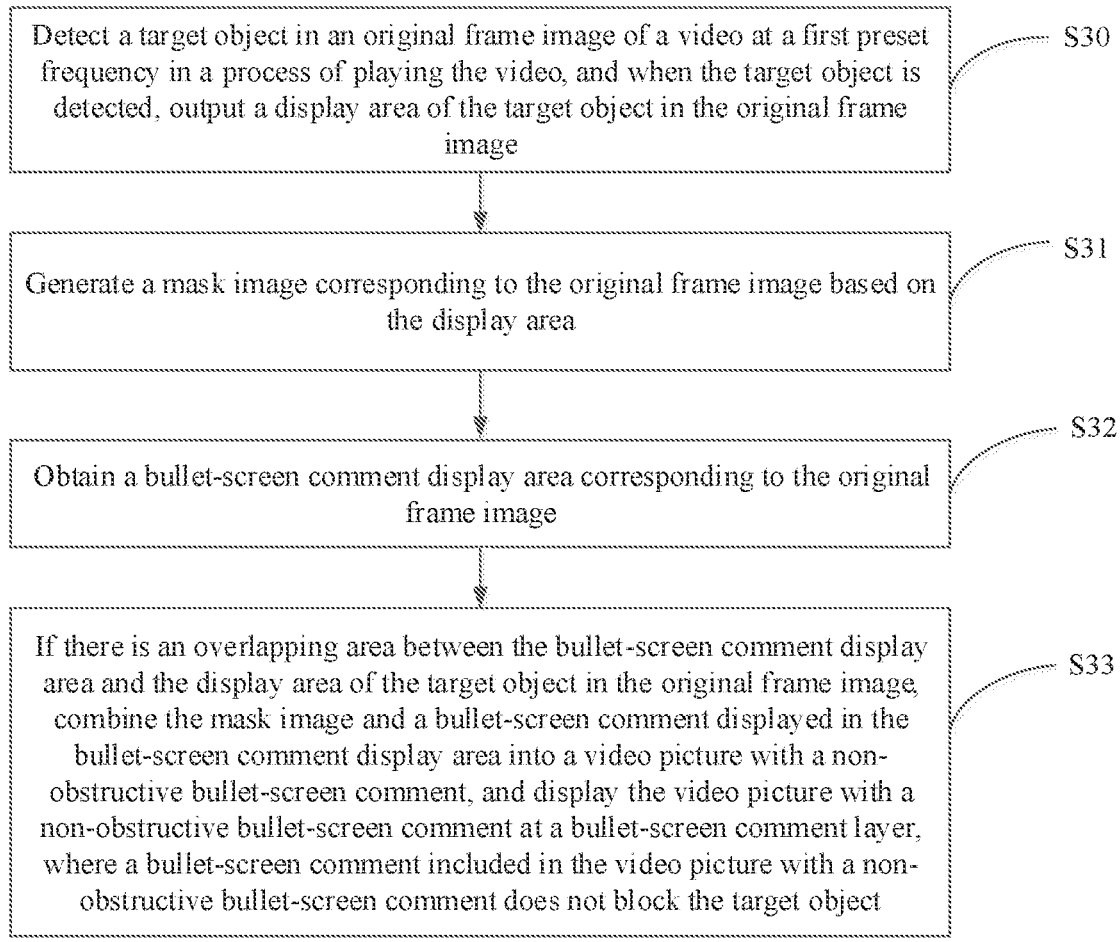
FIG. 3 is a flowchart of an embodiment of a bullet-screen comment display method according to this application.

FIG. 3 is a schematic flowchart of a bullet-screen comment display method according to an embodiment of this application. The bullet-screen comment display method in this application is applied to a client. The client may be a live video client or a non-live video client. This is not limited in this embodiment. It may be understood that the flowchart in this method embodiment is not used to limit a sequence of performing steps. It may be learned from the figure that the bullet-screen comment display method provided in this embodiment includes the following steps.

Step S31: Detect a target object in an original frame image of a video at a first preset frequency in a process of playing the video, and when the target object is detected, output a display area of the target object in the original frame image.

Optionally, the first preset frequency is a preset time frequency for sampling an original video frame in the video. For example, if the first preset frequency is 15 frames/s, it indicates that the target object needs to be detected in 15 original frame images of the video in 1 second.

In this embodiment, the video may be a live video, or may be a normal on-demand video. The on-demand video may be all types of videos other than the live video. The original video frame is a video frame that is not preprocessed in the video.

In an example implementation, in a process of detecting the target object in the original frame image of the video, the target object may be detected in the original frame image by using a target object detection model obtained based on a machine learning algorithm. For example, the original frame image may be input to the target object detection model obtained based on the machine learning algorithm, whether the original frame image includes the target object is detected by using the target object detection model, and after the target object is detected, the display area of the target object in the original frame image is output by using the target object detection model.

The target object model is a model obtained by training a data set by using the machine learning algorithm, and the display area of the target object may be output from the original frame image by using the target object detection model. In an implementation, an area in which a pixel of the target object is detected may be used as the display area. In another implementation, an area in which a detection box used to frame the target object is located may be used as the display area.

In this embodiment, the target object may include various types of objects such as a person, an animal, and a plant. The target object may include only one object or may include a plurality of objects. Optionally, an object type and a quantity of objects included may be determined based on an actual situation. This is not limited in this embodiment. For example, if the video is a movie, each person in the movie may be used as the target object. For another example, if the video is a live game, each game role in the game may be used as the target object.

In an implementation, when the live video is played by using the client, the target object may be detected in real time in the original video frame of the obtained live video at the first preset frequency, and when the target object is detected, the display area of the target object in the original video frame image may be output, so that anti-blocking processing may be performed, by performing a subsequent step, on the original video frame in which the target object is detected, so that a bullet-screen comment does not block the target object in the original video frame.

In another implementation, when the on-demand video is played by using the client, the target object may be detected in real time in the original video frame of the obtained video at the first preset frequency, and when the target object is detected, the display area of the target object in the original video frame image may be output, so that anti-blocking processing may be performed, by performing a subsequent step, on the original video frame in which the target object is detected, so that a bullet-screen comment does not block the target object in the original video frame.

In an example implementation, to still implement the bullet-screen comment display manner in this application when performance of a terminal device is relatively low, the detecting a target object in an original frame image of a video at a first preset frequency in a process of playing the video, and when the target object is detected, outputting a display area of the target object in the original frame image includes step A: Sample the original frame image of the video at the first preset frequency in the process of playing the video, and upload the original frame image obtained through sampling to a server, so that the server detects the target object in the original frame image obtained through sampling, and when the target object is detected, the server outputs the display area of the target object in the original frame image; and step B: Receive the display area that is of the target object in the original frame image and that is output by the server.

Optionally, in this application, after obtaining the original frame image through sampling, the client uploads the original frame image obtained through sampling to the server. The server detects the target object in the original frame image obtained through sampling, and when the target object is detected, the server outputs the display area of the target object in the original frame image. In this way, the server implements detection processing, so that the technical solutions in this application can be applied to more low-performance devices, to broaden an application scope of this application.

Figure 4:
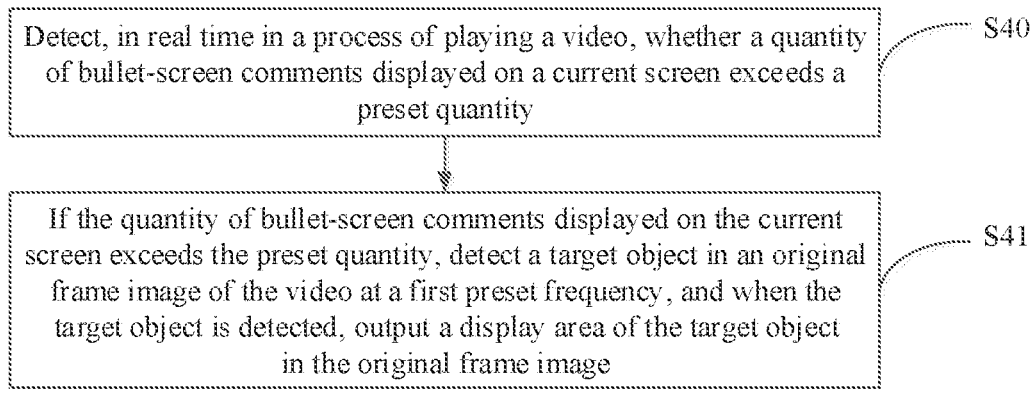
FIG. 4 is a detailed schematic flowchart of a step of detecting a target object in an original frame image of a video at a first preset frequency in a process of playing the video, and when the target object is detected, outputting a display area of the target object in the original frame image according to an implementation of this application.

In an example implementation, referring to FIG. 4, the detecting a target object in an original frame image of a video at a first preset frequency in a process of playing the video, and when the target object is detected, outputting a display area of the target object in the original frame image includes step S40: Detect, in real time in the process of playing the video, whether a quantity of bullet-screen comments displayed on a current screen exceeds a preset quantity; and step S41: If the quantity of bullet-screen comments displayed on the current screen exceeds the preset quantity, detect the target object in the original frame image of the video at the first preset frequency, and when the target object is detected, output the display area of the target object in the original frame image.

Optionally, in the process of playing the video, to avoid a waste of calculation resources that is caused because the target object is still detected in the original frame image of the video when there is no bullet-screen comment, in this embodiment, in the process of playing the video, it is detected in real time whether the quantity of bullet-screen comments displayed on the current screen exceeds the preset quantity. Only when it is detected that the quantity of bullet-screen comments displayed on the current screen exceeds the preset quantity, the target object is detected in the original frame image of the video at the first preset frequency, and when the target object is detected, the display area of the target object in the original frame image is output. When it is detected that the quantity of bullet-screen comments displayed on the current screen does not exceed the preset quantity, the target object is not detected in the original frame image of the video at the first preset frequency, and when the target object is detected, the display area of the target object in the original frame image is output.

The preset quantity may be set and adjusted based on an actual situation. For example, if the preset quantity is 2, it indicates that the target object is detected in the original frame image of the video at the first preset frequency only when at least two bullet-screen comments are displayed on the screen, and when the target object is detected, the display area of the target object in the original frame image is output.

Figure 5:
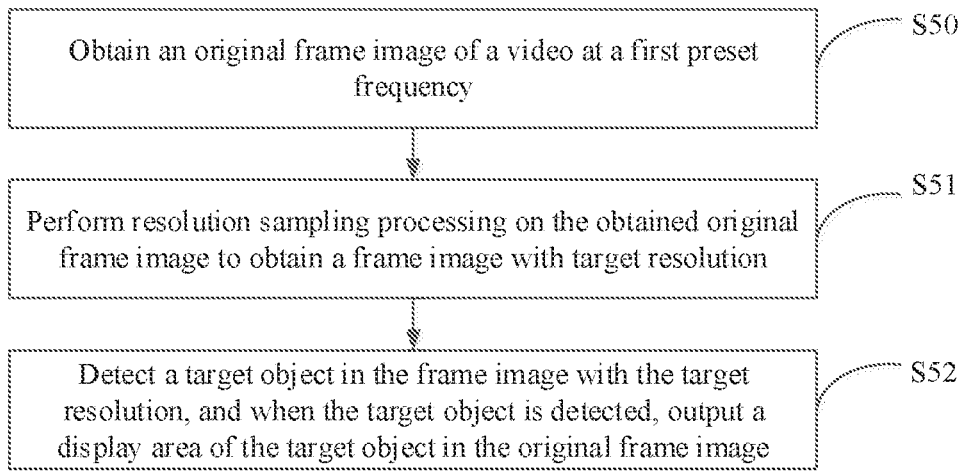
FIG. 5 is a detailed schematic flowchart of a step of detecting a target object in an original frame image of a video at a first preset frequency, and when the target object is detected, outputting a display area of the target object in the original frame image according to an implementation of this application.

In an example implementation, referring to FIG. 5, the detecting a target object in an original frame image of a video at a first preset frequency, and when the target object is detected, outputting a display area of the target object in the original frame image includes:

Step S50: Obtain the original frame image of the video at the first preset frequency.

For example, if a frame rate of the video is 60 and the first preset frequency is 15, in the process of playing the video, one frame of original frame image may be obtained from the video at an interval of 66.67 ms, that is, one frame of original frame image is obtained from the video at an interval of four frames, that is, the first frame of original frame image, the fifth frame of original frame image, the ninth frame of original frame image, . . . , and a 4nth frame of original frame image of the video are sequentially obtained, where n is an integer greater than or equal to 1.

Step S51: Perform resolution sampling processing on the obtained original frame image to obtain a frame image with target resolution.

Optionally, the resolution sampling processing is a processing operation used to reduce resolution of the original frame image, and a frame image with lower resolution may be obtained by performing resolution sampling processing on the original frame image. The target resolution is preset resolution, and may be set and adjusted based on an actual situation. For example, the resolution of the original frame image is 1080P, and the target resolution is 480P.

Step S52: Detect the target object in the frame image with the target resolution, and when the target object is detected, output the display area of the target object in the original frame image.

In this embodiment, resolution sampling processing is performed on the original frame image, and target detection processing is performed on the frame image obtained after resolution sampling processing, to reduce a calculation amount in a target detection processing process and save calculation resources.

Figure 6:
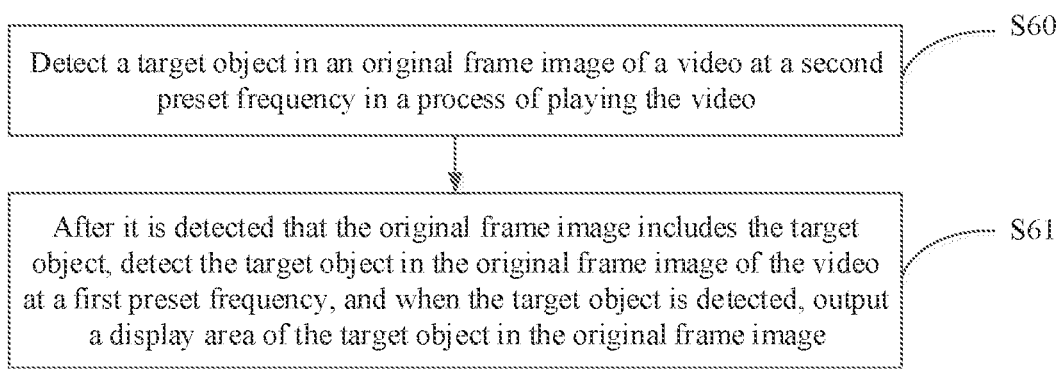
FIG. 6 is a detailed schematic flowchart of a step of detecting a target object in an original frame image of a video at a first preset frequency in a process of playing the video, and when the target object is detected, outputting a display area of the target object in the original frame image according to an implementation of this application.

In an example implementation, referring to FIG. 6, the detecting a target object in an original frame image of a video at a first preset frequency in a process of playing the video, and when the target object is detected, outputting a display area of the target object in the original frame image includes step S60: Detect the target object in the original frame image of the video at a second preset frequency in the process of playing the video; and step S61: After it is detected that the original frame image includes the target object, detect the target object in the original frame image of the video at the first preset frequency, and when the target object is detected, output the display area of the target object in the original frame image.

Optionally, the second preset frequency is preset, and may be set and modified based on an actual situation. For example, the second preset frequency is 10 frames/s, that is, 10 frames of original frame images of the video are obtained in 1 second, and then the target object is detected in the obtained original frame images. In this embodiment, once it is detected that the original frame image includes the target object, a sampling frequency of the original video frame is adjusted immediately, so that the second preset frequency is adjusted to the first preset frequency.

It should be noted that the second preset frequency is less than the first preset frequency.

In this embodiment, when the target object does not exist in the original frame image, the target object is detected in the original frame image at a relatively low frequency, and after the target object is detected, the target object is detected in the original frame image at a relatively high frequency, so that consumption of calculation resources can be reduced while an effect of a non-obstructive bullet-screen comment is achieved.

Step S31: Generate a mask image corresponding to the original frame image based on the display area.

Figure 9:
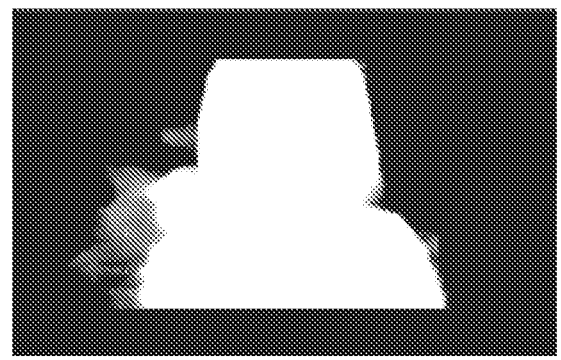
FIG. 9 is a schematic diagram of a mask image according to an implementation of this application.

Optionally, the mask image is an image in a PNG format, and includes contour information of the display area. As shown in FIG. 9, a contour area of the mask image is fully transparent, and another area is in pure black.

Step S32: Obtain a bullet-screen comment display area corresponding to the original frame image.

Optionally, the bullet-screen comment display area is a display position of each bullet-screen comment. In this embodiment, a bullet-screen comment displayed on the screen usually moves from right to left, that is, each frame of original frame image of the video has a corresponding bullet-screen comment display area.

It may be understood that in this embodiment, each time it is detected that a current original frame image includes the target object, a display area of the target object in the current original frame image is output, and the following steps are performed: Step 1: Generate a mask image corresponding to the original frame image based on the display area; step 2: Obtain a bullet-screen comment display area corresponding to the original frame image; and step 3: If there is an overlapping area between the bullet-screen comment display area and the display area of the target object in the original frame image, combine the mask image and a bullet-screen comment displayed in the bullet-screen comment display area into a video picture with a non-obstructive bullet-screen comment, and display the video picture with a non-obstructive bullet-screen comment at a bullet-screen comment layer, where a bullet-screen comment included in the video picture with a non-obstructive bullet-screen comment does not block the target object.

In this embodiment, a bullet-screen comment display area corresponding to each frame of original frame image may be determined based on a display time period of bullet-screen comment information and a display time of a target original frame image. For example, a bullet-screen comment file of a video A includes N pieces of bullet-screen comment information, a display time period corresponding to bullet-screen comment information 1 is 00:00:05-00:00:10, a display time period corresponding to bullet-screen comment information 2 is 00:00:06-00:00:11, . . . , and a display time period corresponding to bullet-screen comment information N is 00:20:00-00:20:10. It may be determined, based on a display time of each piece of bullet-screen comment information, that bullet-screen comment information corresponding to the first frame of original frame image is the bullet-screen comment information 1 to bullet-screen comment information 5, bullet-screen comment information corresponding to the second frame of original frame image is the bullet-screen comment information 1 to bullet-screen comment information 8, . . . . and bullet-screen comment information corresponding to the Nth frame of original frame image is bullet-screen comment information (N−3) to bullet-screen comment information N. A bullet-screen comment display area of each piece of bullet-screen comment information in the target frame image may be determined based on a quantity and content of pieces of bullet-screen comment information corresponding to the target original frame image.

Step S33: If there is an overlapping area between the bullet-screen comment display area and the display area of the target object in the original frame image, combine the mask image and a bullet-screen comment displayed in the bullet-screen comment display area into a video picture with a non-obstructive bullet-screen comment, and display the video picture with a non-obstructive bullet-screen comment at a bullet-screen comment layer, where a bullet-screen comment included in the video picture with a non-obstructive bullet-screen comment does not block the target object.

Optionally, the video picture with a non-obstructive bullet-screen comment is a picture in which a bullet-screen comment is displayed and the bullet-screen comment does not block the target object.

In this embodiment, when the currently played original video frame includes the target object, and there is an overlapping area between the bullet-screen comment display area corresponding to the currently played original video frame and the display area corresponding to the target object, a bullet-screen comment that is currently to be displayed at the bullet-screen comment layer and the mask image are combined to obtain a video picture with a non-obstructive bullet-screen comment, and the video picture with a non-obstructive bullet-screen comment is displayed at the bullet-screen comment layer. In this way, when the bullet-screen comment is displayed, the target object included in the original video frame is not blocked by the bullet-screen comment.

In an implementation, when the mask image and the bullet-screen comment displayed in the bullet-screen comment display area are combined into a video picture with a non-obstructive bullet-screen comment, a bullet-screen comment located at a corresponding position of the mask image may be blocked by using the mask image. In this way, in the video picture that is with a non-obstructive bullet-screen comment and that is obtained through combination, no bullet-screen comment is displayed in an area corresponding to the target object included in the original video frame, and a bullet-screen comment is normally displayed in other areas, to achieve the effect of a non-obstructive bullet-screen comment.

In another implementation, when the mask image and the bullet-screen comment displayed in the bullet-screen comment display area are combined into a video picture with a non-obstructive bullet-screen comment, a bullet-screen comment located at a corresponding position of the mask image may be blocked by using the mask image, and a blocked bullet-screen comment is displayed at other positions, so that all bullet-screen comments are displayed, and the target object included in the original frame image is not blocked, to achieve the effect of a non-obstructive bullet-screen comment.

In this embodiment, the target object is detected in the original frame image of the video at the first preset frequency in the process of playing the video, and when the target object is detected, the display area of the target object in the original frame image is output; the mask image corresponding to the original frame image is generated based on the display area; the bullet-screen comment display area corresponding to the original frame image is obtained; and if there is an overlapping area between the bullet-screen comment display area and the display area of the target object in the original frame image, the mask image and the bullet-screen comment displayed in the bullet-screen comment display area are combined into a video picture with a non-obstructive bullet-screen comment, and the video picture with a non-obstructive bullet-screen comment is displayed at the bullet-screen comment layer, where the bullet-screen comment included in the video picture with a non-obstructive bullet-screen comment does not block the target object. Therefore, an anti-blocking effect can be achieved.

In this application, in a bullet-screen comment display process, the video picture with a non-obstructive bullet-screen comment is displayed, to prevent a bullet-screen comment from blocking the target object in the video, and improve user experience. In addition, detection processing is performed on the original frame image of the video at the first preset frequency, so that no processing needs to be performed on all original video frames, to reduce occupation of calculation resources of a terminal device. In addition, in this application, the mask image is calculated in real time in the client. Compared with a manner, in the conventional technology, in which the mask image is calculated in real time by using an online streamer device, consumption of network resources for uploading the mask image to the video server can be reduced. That is, the implementation of this application can reduce calculation costs, storage costs, and bandwidth costs of a video service provider.

In an example implementation, the method further includes:
providing a frequency setting interface, so that a user sets the first preset frequency based on the frequency setting interface.

In this embodiment, to help implement a case in which the bullet-screen comment display method in this application may be used when the user uses terminal devices with different device performance, in this application, a frequency setting interface may be provided. In this way, the user may set the first preset frequency based on specified performance of a device used by the user. In this way, when the user uses a terminal device with high performance, a relatively high first preset frequency may be set; or when the user uses a terminal device with low performance, a generally high first preset frequency may be set.

It may be understood that when a higher first preset frequency is set, a better effect of a non-obstructive bullet-screen comment is achieved, but more calculation resources are consumed by the device.

It should be noted that a maximum value of the first preset frequency is the same as the frame rate of the video.

In an example implementation, to reduce a calculation delay, the target object may be detected in the original frame image of the video at the first preset frequency by using a first thread in the process of playing the video, and when the target object is detected, the display area of the target object in the original frame image is output; and the mask image corresponding to the original frame image is generated in parallel based on the display area by using the second thread.

Figure 7:
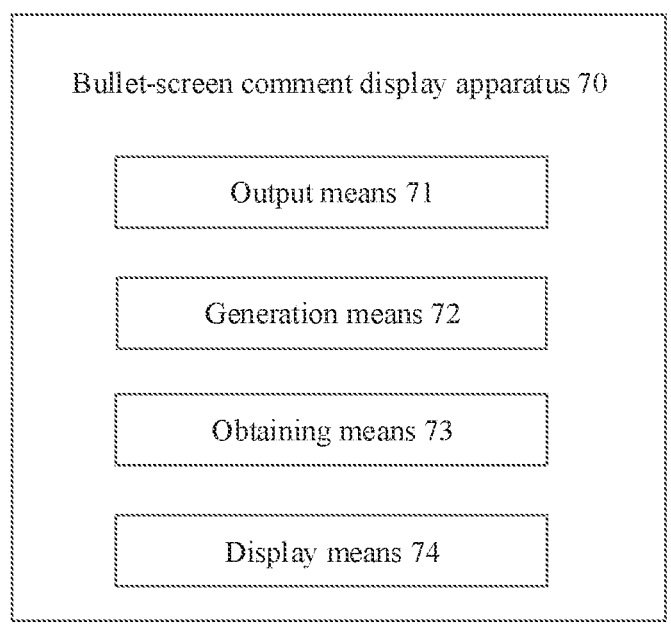
FIG. 7 is a program means diagram of an embodiment of a bullet-screen comment display apparatus according to this application.

FIG. 7 is a program means diagram of an embodiment of a bullet-screen comment display apparatus 70 according to this application.

In this embodiment, the bullet-screen comment display apparatus 70 includes a series of computer program instructions stored in a memory. When the computer program instructions are executed by a processor, the bullet-screen comment display function according to embodiments of this application can be implemented. In some embodiments, based on an operation implemented by each part of the computer program instructions, the bullet-screen comment display apparatus 70 may be divided into one or more means, and may be optionally divided into the following means:

an output means 71, configured to: detect a target object in an original frame image of a video at a first preset frequency in a process of playing the video, and when the target object is detected, output a display area of the target object in the original frame image, a generation means 72, configured to generate a mask image corresponding to the original frame image based on the display area;

an obtaining means 73, configured to obtain a bullet-screen comment display area corresponding to the original frame image; and a display means 74, configured to: if there is an overlapping area between the bullet-screen comment display area and the display area of the target object in the original frame image, combine the mask image and a bullet-screen comment displayed in the bullet-screen comment display area into a video picture with a non-obstructive bullet-screen comment, and display the video picture with a non-obstructive bullet-screen comment at a bullet-screen comment layer, where a bullet-screen comment included in the video picture with a non-obstructive bullet-screen comment does not block the target object.

In an example implementation, the output means 71 is further configured to: detect, in real time in the process of playing the video, whether a quantity of bullet-screen comments displayed on a current screen exceeds a preset quantity; and if the quantity of bullet-screen comments displayed on the current screen exceeds the preset quantity, detect the target object in the original frame image of the video at the first preset frequency, and when the target object is detected, output the display area of the target object in the original frame image.

In an example implementation, the output means 71 is further configured to: obtain the original frame image of the video at the first preset frequency; perform resolution sampling processing on the obtained original frame image to obtain a frame image with target resolution; and detect the target object in the frame image with the target resolution, and when the target object is detected, output the display area of the target object in the original frame image.

In an example implementation, the output means 71 is further configured to: detect the target object in the original frame image of the video at a second preset frequency in the process of playing the video; and after it is detected that the original frame image includes the target object, detect the target object in the original frame image of the video at the first preset frequency, and when the target object is detected, output the display area of the target object in the original frame image.

In an example implementation, the bullet-screen comment display apparatus 70 further includes a providing means; and
the providing means is configured to provide a frequency setting interface, so that a user sets the first preset frequency based on the frequency setting interface.

In an example implementation, the output means 71 is further configured to: detect the target object in the original frame image of the video at the first preset frequency by using a first thread in the process of playing the video, and when the target object is detected, output the display area of the target object in the original frame image; and
the generation means 72 is further configured to generate the mask image corresponding to the original frame image based on the display area by using a second thread.

In an example implementation, the output means 71 is further configured to: detect the target object in the original frame image of the video by using a target object detection model obtained based on a machine learning algorithm, and when the target object is detected, output the display area of the target object in the original frame image.

Figure 8:
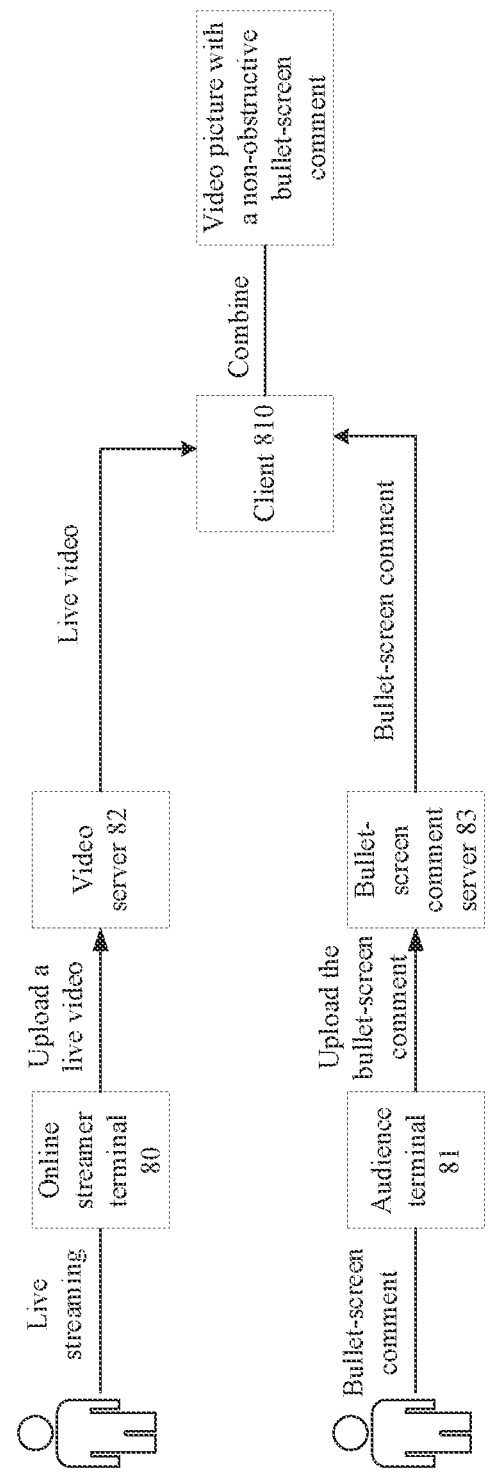
FIG. 8 is a schematic flowchart of implementing a bullet-screen comment display method by a bullet-screen comment display system.

FIG. 8 is a schematic flowchart of implementing a bullet-screen comment display method by a bullet-screen comment display system according to this application.

Referring to FIG. 8, the bullet-screen comment display system includes an online streamer terminal 80, a plurality of clients 810 installed on an audience terminal 81, a video server 82, and a bullet-screen comment server 83. The audience terminal 81 is a terminal device of an audience user who views, in a live room of an online streamer, live streaming performed by the online streamer by using the online streamer terminal 80.

In this embodiment, when the online streamer performs live streaming by using the online streamer terminal 80, the online streamer terminal 80 uploads a live video of the online streamer to the video server 82. When receiving the live video uploaded by the online streamer terminal 80, the video server 82 forwards the live video to the audience terminal 81 of the audience user who views the live video in the live room of the online streamer. The audience user who views the live video in the live room may send a bullet-screen comment by using the audience terminal 81. After the audience user sends the bullet-screen comment by using the audience terminal 81, the audience terminal 81 uploads the bullet-screen comment to the bullet-screen comment server 83. After receiving the bullet-screen comment sent by each audience terminal 81, the bullet-screen comment server 83 stores the bullet-screen comment sent by the audience user, and forwards the stored bullet-screen comment to each client 810, so that when playing the live video, each client 810 displays the bullet-screen comment sent by the audience user. Each client 810 detects a target object in an original frame image of the video at a first preset frequency in a process of playing the live video, and when the target object is detected, outputs a display area of the target object in the original frame image; generates a mask image corresponding to the original frame image based on the display area; obtains a bullet-screen comment display area corresponding to the original frame image; and if there is an overlapping area between the bullet-screen comment display area and the display area of the target object in the original frame image, combines the mask image and a bullet-screen comment displayed in the bullet-screen comment display area into a video picture with a non-obstructive bullet-screen comment, and displays the video picture with a non-obstructive bullet-screen comment at a bullet-screen comment layer, where a bullet-screen comment included in the video picture with a non-obstructive bullet-screen comment does not block the target object.

Figure 10:
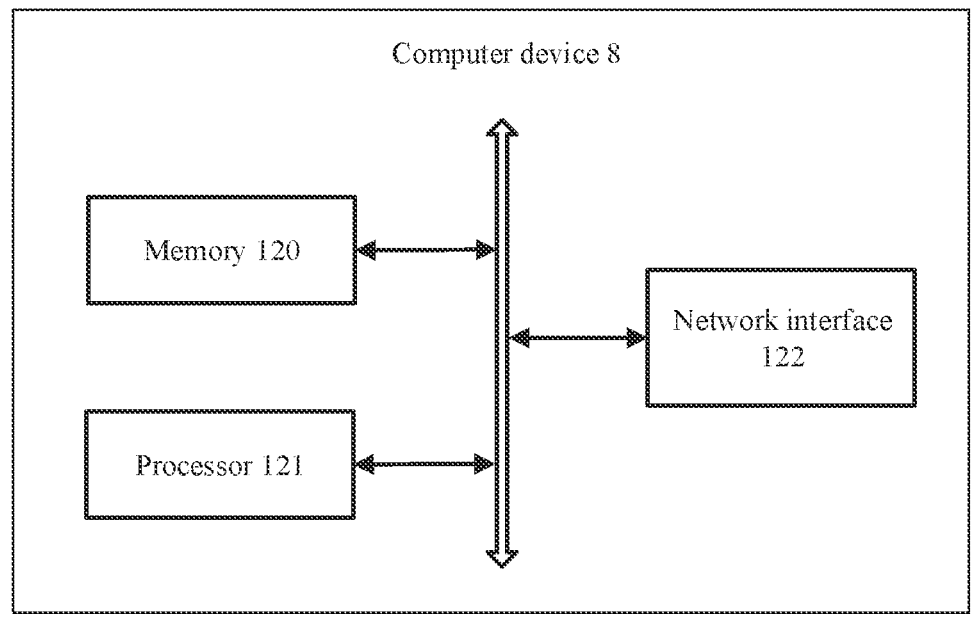
FIG. 10 is a schematic diagram of a hardware structure of a computer device that performs a bullet-screen comment display method according to an embodiment of this application.

FIG. 10 is a schematic diagram of a hardware architecture of a computer device 8 suitable for implementing a bullet-screen comment display method according to an embodiment of this application. In this embodiment, the computer device 8 is a device that can automatically calculate a value and/or process information based on an instruction that is set or stored in advance. For example, the computer device 8 may be a tablet computer, a notebook computer, a desktop computer, a rack server, a blade server, a tower server, a cabinet server (including an independent server, or a server cluster including a plurality of servers), or the like. As shown in FIG. 10, the computer device 8 at least includes but is not limited to a memory 111, a processor 121, and a network interface 122 that can be communicatively connected to each other by using a system bus.

The memory 111 includes at least one type of computer-readable storage medium. The readable storage medium may be volatile or nonvolatile. Optionally, the readable storage medium includes a flash memory, a hard disk, a multimedia card, a card-type memory (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, or the like. In some embodiments, the memory 111 may be an internal storage means of the computer device 8, for example, a hard disk or a memory of the computer device 8. In some other embodiments, the memory 111 may be an external storage device of the computer device 8, for example, a removable hard disk, a smart media card (SMC), a secure digital (SD) card, or a flash card that is disposed on the computer device 8. Certainly, the memory 111 may include both an internal storage means of the computer device 8 and an external storage device of the computer device 8. In this embodiment, the memory 11*l* is usually configured to store an operating system and various types of application software that are installed on the computer device 8, for example, program code of the bullet-screen comment display method. In addition, the memory 111 may be further configured to temporarily store various types of data that have been output or are to be output.

In some embodiments, the processor 121 may be a central processing unit (CPU), a controller, a microcontroller, a microprocessor, or another bullet-screen comment display chip. The processor 121 is usually configured to control an overall operation of the computer device 8, for example, perform control and processing related to data exchange or communication performed by the computer device 8. In this embodiment, the processor 121 is configured to run program code stored in the memory 111 or process data.

The network interface 122 may include a wireless network interface or a wired network interface, and the network interface 122 is usually configured to establish a communication link between the computer device 8 and another computer device. For example, the network interface 122 is configured to connect the computer device 8 to an external terminal by using a network, to establish a data transmission channel and a communication link between the computer device 8 and the external terminal. The network may be a wireless or wired network such as an intranet, the Internet, a global system for mobile communications (GSM), wideband code division multiple access (WCDMA), a 4G network, a 50 network, Bluetooth, or Wi-Fi.

It should be noted that FIG. 10 shows only a computer device with the components 111 to 122. However, it should be understood that implementation of all the shown components is not required, and more or fewer components may alternatively be implemented.

In this embodiment, the bullet-screen comment display method stored in the memory 111 may be further divided into one or more program means to be executed by one or more processors (the processor 121 in this embodiment), to complete this application.

An embodiment of this application provides a computer-readable storage medium. The computer-readable storage medium stores a computer program. When the computer program is executed by a processor, the steps of the bullet-screen comment display method in the embodiments are implemented.

In this embodiment, the computer-readable storage medium includes a flash memory, a hard disk, a multimedia card, a card-type memory (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, or the like. In some embodiments, the computer-readable storage medium may be an internal storage unit of a computer device, for example, a hard disk or a memory of the computer device. In some other embodiments, the computer-readable storage medium may be an external storage device of the computer device, for example, a removable hard disk, a smart media card (SMC), a secure digital (SD) card, or a flash card that is disposed on the computer device. Certainly, the computer-readable storage medium may include both an internal storage unit of the computer device and an external storage device of the computer device. In this embodiment, the computer-readable storage medium is usually configured to store an operating system and various types of application software that are installed on the computer device, for example, program code of the bullet-screen comment display method in the embodiments. In addition, the computer-readable storage medium may be further configured to temporarily store various types of data that have been output or are to be output.

The apparatus embodiments described above are only examples, and units described as separate parts may or may not be physically separated, and parts displayed as units may or may not be physical units, that is, may be located at one position, or may be distributed on at least two network units. Some or all of the means may be selected based on an actual need to achieve the objective of the solutions of the embodiments of this application. Persons of ordinary skill in the art may understand and implement the embodiments without creative efforts.

Based on the foregoing descriptions of the implementations, persons of ordinary skill in the art may clearly understand that the implementations may be implemented by software in addition to a universal hardware platform, or certainly, may be implemented by hardware. Persons of ordinary skill in the art may understand that all or some of procedures for implementing the methods in the foregoing embodiments may be completed by a computer program instructing related hardware. The program may be stored in a computer-readable storage medium. When the program is executed, the procedures of the embodiments of the foregoing methods may be included. The storage medium may be a magnetic disk, an optical disc, a read-only memory (ROM), a random access memory (RAM), or the like.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A method, applied to a client, comprising:
   detecting a target object in an original frame image of a video at a first preset frequency in a process of playing the video, and when the target object is detected, outputting a display area of the target object in the original frame image;
   generating a mask image corresponding to the original frame image based on the display area;
   obtaining a bullet-screen comment display area corresponding to the original frame image; and
   in response to there being an overlapping area between the bullet-screen comment display area and the display area of the target object in the original frame image, combining the mask image and a bullet-screen comment displayed in the bullet-screen comment display area into a video picture with a non-obstructive bullet-screen comment, and displaying the video picture with a non-obstructive bullet-screen comment at a bullet-screen comment layer, wherein a bullet-screen comment comprised in the video picture with a non-obstructive bullet-screen comment does not block the target object.

2. The method according to claim 1, wherein the detecting a target object in an original frame image of a video at a first preset frequency in a process of playing the video, and when the target object is detected, outputting a display area of the target object in the original frame image comprises:
   detecting, in real time in the process of playing the video, whether a quantity of bullet-screen comments displayed on a current screen exceeds a preset quantity; and
   in response to the quantity of bullet-screen comments displayed on the current screen exceeding the preset quantity, detecting the target object in the original frame image of the video at the first preset frequency, and when the target object is detected, outputting the display area of the target object in the original frame image.

3. The method according to claim 1, wherein the detecting a target object in an original frame image of a video at a first preset frequency, and when the target object is detected, outputting a display area of the target object in the original frame image comprises:
  obtaining the original frame image of the video at the first preset frequency;
  performing resolution sampling processing on the obtained original frame image to obtain a frame image with target resolution; and
  detecting the target object in the frame image with the target resolution, and when the target object is detected, outputting the display area of the target object in the original frame image.

4. The method according to claim 1, wherein the detecting a target object in an original frame image of a video at a first preset frequency in a process of playing the video, and when the target object is detected, outputting a display area of the target object in the original frame image comprises:
  detecting the target object in the original frame image of the video at a second preset frequency in the process of playing the video; and
  after it is detected that the original frame image comprises the target object, detecting the target object in the original frame image of the video at the first preset frequency, and when the target object is detected, outputting the display area of the target object in the original frame image.

5. The method according to claim 1, further comprising:
  providing a frequency setting interface, so that a user sets the first preset frequency based on the frequency setting interface.

6. The method according to claim 1, wherein the detecting a target object in an original frame image of a video at a first preset frequency in a process of playing the video, and when the target object is detected, outputting a display area of the target object in the original frame image comprises:
  detecting the target object in the original frame image of the video at the first preset frequency by using a first thread in the process of playing the video, and when the target object is detected, outputting the display area of the target object in the original frame image; and
  the generating a mask image corresponding to the original frame image based on the display area comprises:
  generating the mask image corresponding to the original frame image based on the display area by using a second thread.

7. The method according to claim 1, wherein the detecting a target object in an original frame image of a video, and when the target object is detected, outputting a display area of the target object in the original frame image comprises:
  detecting the target object in the original frame image of the video by using a target object detection model obtained based on a machine learning algorithm, and when the target object is detected, outputting the display area of the target object in the original frame image.

8. The method according to claim 1, wherein the detecting a target object in an original frame image of a video at a first preset frequency in a process of playing the video, and when the target object is detected outputting a display area of the target object in the original frame image comprises:
  sampling the original frame image of the video at the first preset frequency in the process of playing the video, and uploading the original frame image obtained through sampling to a server, so that the server detects the target object in the original frame image obtained through sampling, and when the target object is detected, the server outputs the display area of the target object in the original frame image; and
  receiving the display area that is of the target object in the original frame image and that is output by the server.

9. A bullet-screen comment display system, wherein the bullet-screen comment display system comprises an online streamer terminal, a plurality of clients installed on an audience terminal, a video server, and a bullet-screen comment server, and the audience terminal is a terminal device of an audience user who views, in a live room of an online streamer, live streaming performed by the online streamer by using the online streamer terminal;
  the online streamer terminal is configured to upload a live video of the online streamer to the video server;
  the video server is configured to forward the live video to the audience terminal of the audience user who views the live video in the live room of the online streamer;
  the bullet-screen comment server is configured to: store a bullet-screen comment sent by the audience user, and forward the stored bullet-screen comment to each client for display by each client; and
  each client is configured to: detect a target object in an original frame image of the live video at a first preset frequency in a process of playing the live video, and when the target object is detected, output a display area of the target object in the original frame image; generate a mask image corresponding to the original frame image based on the display area; obtain a bullet-screen comment display area corresponding to the original frame image; and in response to there being an overlapping area between the bullet-screen comment display area and the display area of the target object in the original frame image, combine the mask image and a bullet-screen comment displayed in the bullet-screen comment display area into a video picture with a non-obstructive bullet-screen comment, and display the video picture with a non-obstructive bullet-screen comment at a bullet-screen comment layer, wherein a bullet-screen comment comprised in the video picture with a non-obstructive bullet-screen comment does not block the target object.

10. The system according to claim 9, wherein the detecting a target object in an original frame image of a video at a first preset frequency in a process of playing the live video, and when the target object is detected, outputting a display area of the target object in the original frame image comprises:
  detecting, in real time in the process of playing the live video, whether a quantity of bullet-screen comments displayed on a current screen exceeds a preset quantity; and
  in response to the quantity of bullet-screen comments displayed on the current screen exceeding the preset quantity, detecting the target object in the original frame image of the live video at the first preset frequency, and when the target object is detected, outputting the display area of the target object in the original frame image.

11. The system according to claim 9, wherein the detecting a target object in an original frame image of a video at a first preset frequency, and when the target object is detected, outputting a display area of the target object in the original frame image comprises:
  obtaining the original frame image of the live video at the first preset frequency;

performing resolution sampling processing on the obtained original frame image to obtain a frame image with target resolution; and detecting the target object in the frame image with the target resolution, and when the target object is detected, outputting the display area of the target object in the original frame image.

12. The system according to claim 9, wherein the detecting a target object in an original frame image of a video at a first preset frequency in a process of playing the live video, and when the target object is detected, outputting a display area of the target object in the original frame image comprises:

detecting the target object in the original frame image of the live video at a second preset frequency in the process of playing the live video; and after it is detected that the original frame image comprises the target object, detecting the target object in the original frame image of the live video at the first preset frequency, and when the target object is detected, outputting the display area of the target object in the original frame image.

13. The system according to claim 9, wherein the detecting a target object in an original frame image of a video at a first preset frequency in a process of playing the live video, and when the target object is detected, outputting a display area of the target object in the original frame image comprises:

detecting the target object in the original frame image of the live video at the first preset frequency by using a first thread in the process of playing the live video, and when the target object is detected, outputting the display area of the target object in the original frame image; and the generating a mask image corresponding to the original frame image based on the display area comprises:

generating the mask image corresponding to the original frame image based on the display area by using a second thread.

14. The system according to claim 9, wherein the detecting a target object in an original frame image of a video at a first preset frequency in a process of playing the live video, and when the target object is detected, outputting a display area of the target object in the original frame image comprises:

sampling the original frame image of the live video at the first preset frequency in the process of playing the live video, and uploading the original frame image obtained through sampling to a server, so that the server detects the target object in the original frame image obtained through sampling, and when the target object is detected, the server outputs the display area of the target object in the original frame image; and receiving the display area that is of the target object in the original frame image and that is output by the server.

15. A non-transitory computer-readable storage medium, wherein the computer-readable storage medium stores computer-readable instructions, and when the computer-readable instructions are executed by a processor, the processor performs operations comprising:

detecting a target object in an original frame image of a video at a first preset frequency in a process of playing the video, and when the target object is detected, outputting a display area of the target object in the original frame image;

generating a mask image corresponding to the original frame image based on the display area;

obtaining a bullet-screen comment display area corresponding to the original frame image; and in response to there being an overlapping area between the bullet-screen comment display area and the display area of the target object in the original frame image, combining the mask image and a bullet-screen comment displayed in the bullet-screen comment display area into a video picture with a non-obstructive bullet-screen comment, and displaying the video picture with a non-obstructive bullet-screen comment at a bullet-screen comment layer, wherein a bullet-screen comment comprised in the video picture with a non-obstructive bullet-screen comment does not block the target object.

16. The non-transitory computer-readable storage medium according to claim 15, wherein the detecting a target object in an original frame image of a video at a first preset frequency in a process of playing the video, and when the target object is detected, outputting a display area of the target object in the original frame image comprises:

detecting, in real time in the process of playing the video, whether a quantity of bullet-screen comments displayed on a current screen exceeds a preset quantity; and in response to the quantity of bullet-screen comments displayed on the current screen exceeding the preset quantity, detecting the target object in the original frame image of the video at the first preset frequency, and when the target object is detected, outputting the display area of the target object in the original frame image.

17. The non-transitory computer-readable storage medium according to claim 15, wherein the detecting a target object in an original frame image of a video at a first preset frequency, and when the target object is detected, outputting a display area of the target object in the original frame image comprises:

obtaining the original frame image of the video at the first preset frequency;

performing resolution sampling processing on the obtained original frame image to obtain a frame image with target resolution; and detecting the target object in the frame image with the target resolution, and when the target object is detected, outputting the display area of the target object in the original frame image.

18. The non-transitory computer-readable storage medium according to claim 15, wherein the detecting a target object in an original frame image of a video at a first preset frequency in a process of playing the video, and when the target object is detected, outputting a display area of the target object in the original frame image comprises:

detecting the target object in the original frame image of the video at a second preset frequency in the process of playing the video; and after it is detected that the original frame image comprises the target object, detecting the target object in the original frame image of the video at the first preset frequency, and when the target object is detected, outputting the display area of the target object in the original frame image.

19. The non-transitory computer-readable storage medium according to claim 15, wherein the detecting a target object in an original frame image of a video at a first preset frequency in a process of playing the video, and when the target object is detected, outputting a display area of the target object in the original frame image comprises:

detecting the target object in the original frame image of the video at the first preset frequency by using a first thread in the process of playing the video, and when the target object is detected, outputting the display area of the target object in the original frame image; and the generating a mask image corresponding to the original frame image based on the display area comprises:

generating the mask image corresponding to the original frame image based on the display area by using a second thread.

20. The non-transitory computer-readable storage medium according to claim 15, wherein the detecting a target object in an original frame image of a video at a first preset frequency in a process of playing the video, and when the target object is detected, outputting a display area of the target object in the original frame image comprises:

sampling the original frame image of the video at the first preset frequency in the process of playing the video, and uploading the original frame image obtained through sampling to a server, so that the server detects the target object in the original frame image obtained through sampling, and when the target object is detected, the server outputs the display area of the target object in the original frame image; and receiving the display area that is of the target object in the original frame image and that is output by the server.

* * * * *